United States Patent [19]

Uchida

[11] Patent Number: 5,445,264

[45] Date of Patent: Aug. 29, 1995

[54] FLOPPY DISK ACCOMMODATION DEVICE

[75] Inventor: Hiromichi Uchida, Tokyo, Japan

[73] Assignee: Toyo Chemical Co., Ltd., Tokyo, Japan

[21] Appl. No.: 228,879

[22] Filed: Apr. 18, 1994

[51] Int. Cl.$^6$ .................... B65D 85/57; B65D 69/00
[52] U.S. Cl. ................... 206/307; 206/307.1;
  206/308.3; 206/232; 229/72
[58] Field of Search ............. 206/444, 232, 461, 471,
  206/307, 307.1; 383/39; 229/72; 281/31

[56] References Cited

U.S. PATENT DOCUMENTS

| | | | |
|---|---|---|---|
| 3,503,141 | 3/1970 | Schwartz | 281/31 |
| 3,839,960 | 10/1974 | Bissonet | 281/31 |
| 4,361,231 | 11/1982 | Patience | 383/39 |
| 4,892,194 | 1/1990 | Garcia | 206/461 |
| 4,896,027 | 1/1990 | Drexler | 206/461 |
| 4,974,983 | 12/1990 | Givati | 206/232 |
| 5,207,717 | 5/1993 | Manning | 206/232 |
| 5,224,599 | 7/1993 | Uchida | 206/444 |

Primary Examiner—Steven N. Meyers
Assistant Examiner—Tara L. Laster
Attorney, Agent, or Firm—Wenderoth, Lind & Ponack

[57] ABSTRACT

A floppy disk accommodation device has a synthetic resin sheet for accommodating and storing a plurality of floppy disks in a stable state. The synthetic resin sheet has one or more floppy disk accommodation recesses 3 formed at respective positions thereon. In a lower portion of each floppy disk accommodation recess 3, a bag-like floppy disk detachment-free accommodation section 5 is formed. The surface of the floppy disk accommodation recess 3 is formed, above an upper opening of the accommodation section, with stoppers 6 for preventing detachment of the floppy disk 4. The recess surface is also formed, between the opening of the bag-like floppy disk detachment-free accommodation section 5 and the stoppers 6, with a ridge 7 for providing a gap between the back surface of an upper portion of the accommodated floppy disk 4 and the floppy disk accommodation recess surface.

8 Claims, 5 Drawing Sheets

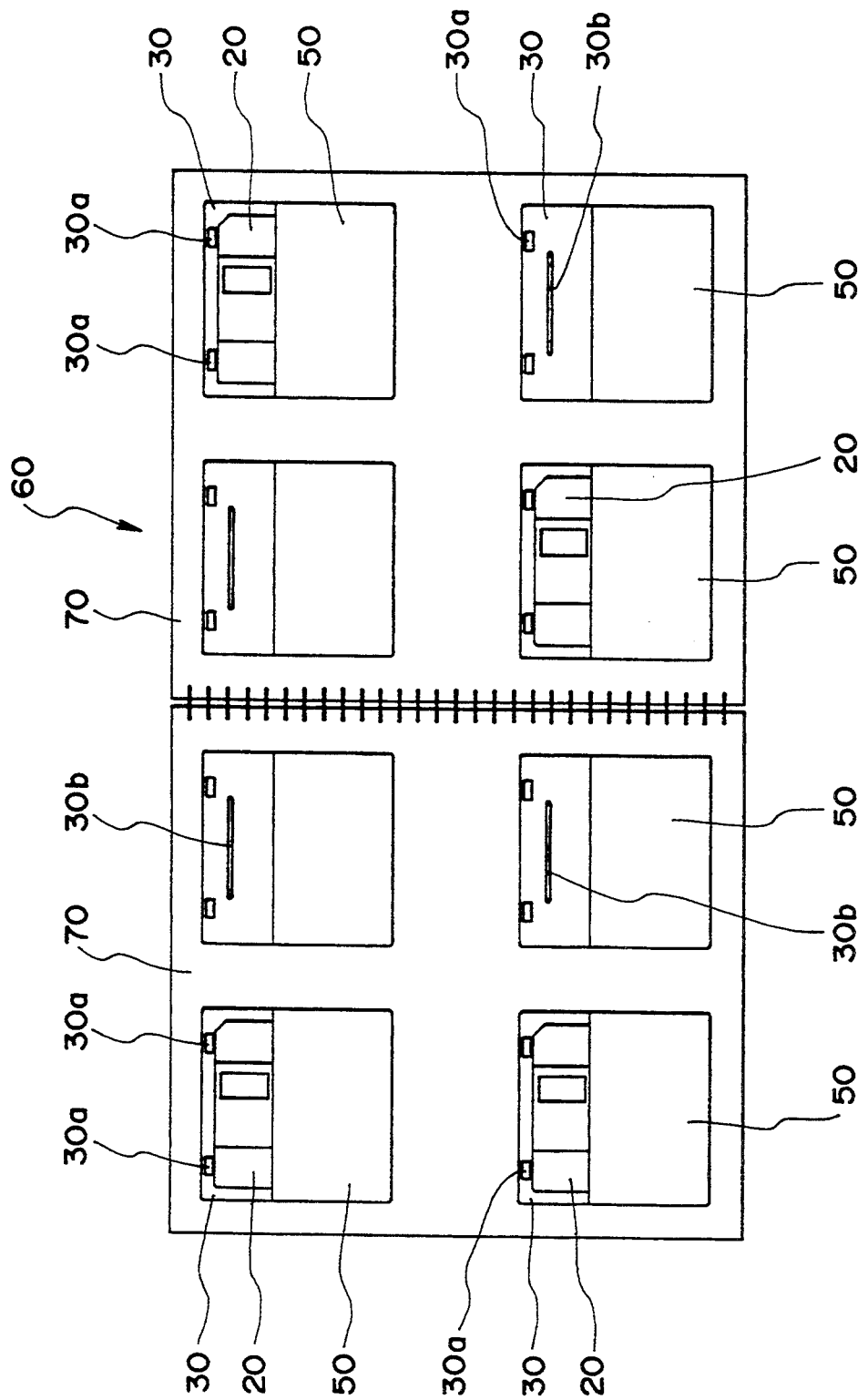

5,445,264

FLOPPY DISK ACCOMMODATION DEVICE

BACKGROUND OF THE INVENTION

1. Field of the Invention

This invention relates to a floppy disk accommodation device for accommodating and storing floppy disks and, more particularly, to a floppy disk accommodation device which is useful when accommodating a plurality of floppy disks in a sheet-like accommodation member and using a plurality of such accommodation members bound in a binder

2. Prior Art

FIG. 3 shows a floppy disk accommodation device invented earlier by the present inventor, and is disclosed in Japanese Utility Model Application No. H4-35148. The device comprises a sheet-like member 30 and a film member stuck to the member 30 so as to form a bag-like floppy disk accommodation section 50 having a top opening 50a. The front surface of the sheet-like member 30 is provided, above the top opening 50a of the accommodation section 50, with stoppers 30a, which prevent slip-out of a floppy disk 20 inserted in the floppy disk accommodation section 50 by contacting an upper edge 20a of the floppy disk 20. Further, the front surface of the sheet-like member 30 is provided, between the opening 50a of the accommodation section 50 and the stoppers 30a, a ridge 30b for providing a gap between a portion of the inserted floppy disk 20 adjacent the upper edge 20a thereof and the sheet-like member 30. Further, as shown in FIG. 4, the rear or back surface of the sheet-like member 30 is provided with double sided adhesive tape or similar bonding means.

When using a plurality of such floppy disk accommodation devices 10 such that they are bound in a binder 60 comprising a plurality of binder sheets 70, as shown in FIG. 5, each floppy disk 20 is inserted in a floppy disk accommodation device 10 with its upper edge 20a reliably held in contact with the stoppers 30a.

In the above prior art, the floppy disk can be reliably accommodated without possibility of detachment. In addition, it can be very conveniently taken out. Despite these useful effects, however, when using a plurality of such floppy disk accommodation devices in a binder, an operation requiring a great deal of labor and time is required to apply to the binder sheet a double sided adhesive tape or similar bonding means provided on the rear or back surface of the sheet-like member.

In another aspect, the function of accommodating the floppy disk is mainly provided by the bag-like floppy accommodation section. Therefore, if the bag-like member is formed such that it is narrow, although it can reliably prevent the detachment of the floppy disk, it is rather difficult to insert and remove the floppy disk. If the floppy disk is inserted incorrectly, it may cause separation of the sheet-like member and the film member of the bag-like accommodation section from the bonded state.

When the accommodation section is formed loosely, on the other hand, although the floppy disk may be readily inserted and taken out, it is highly possible that the floppy disk is detached in spite of the presence of the stoppers. Therefore, it has been very difficult to form a bag-like floppy disk accommodation section which can meet both the requirements noted above.

It may be thought to form the bag-like accommodation section, stoppers and ridge noted above such that they are integral with a synthetic resin sheet which forms a binder. This arrangement is convenient in that the bonding means on the rear or back side of the sheet-like member can be dispensed with. In this case, however, the bag-like floppy disk accommodation section is provided with a clearance just sufficient to insert and remove the floppy disk so that the floppy disk will not be readily detached. Therefore, when the floppy disk is inserted, the accommodation section is pulled to an extent corresponding to the thickness of the floppy disk, resulting in distortion and sagging of the synthetic resin sheet. That is, the synthetic resin sheet is in to an uneven state.

Particularly with a sheet which accommodates a plurality of floppy disks, the distortion is seriously great. When such a sheet is used in a binder, a considerable thickness is produced. Therefore, the efficiency of accommodation is very inferior, and it is impossible to obtain the proper function of the binder, which has to satisfactorily permit the arrangement and storage of floppy disks.

Further, the distortion or sagging may be a cause of incapability of nearly arranging and storing floppy disks that are accommodated. Moreover, it affects the life of the synthetic resin sheet. That is the life of the floppy disk accommodation binder is inevitably reduced.

SUMMARY OF THE INVENTION

An object of the invention is to provide a floppy disk accommodation device which can overcome the drawbacks in the prior art and permit a plurality of floppy disks as well as a single floppy disk to be neatly accommodated in a sheet-like binder formation member without distortion or sagging thereof, as well as being free from the possibility of unnecessarily increasing its thickness when it is used in a binder, thus permitting the floppy disk to be accommodated in a stable state, perfectly preventing detachment of the accommodated floppy disk and more perfectly permitting the arrangement and storage of floppy disks.

BRIEF DESCRIPTION OF THE DRAWINGS

FIG. 5 is a front view showing the prior art floppy disk accommodation device in use.

DETAILED DESCRIPTION OF THE PREFERRED EMBODIMENT

Figure 1:
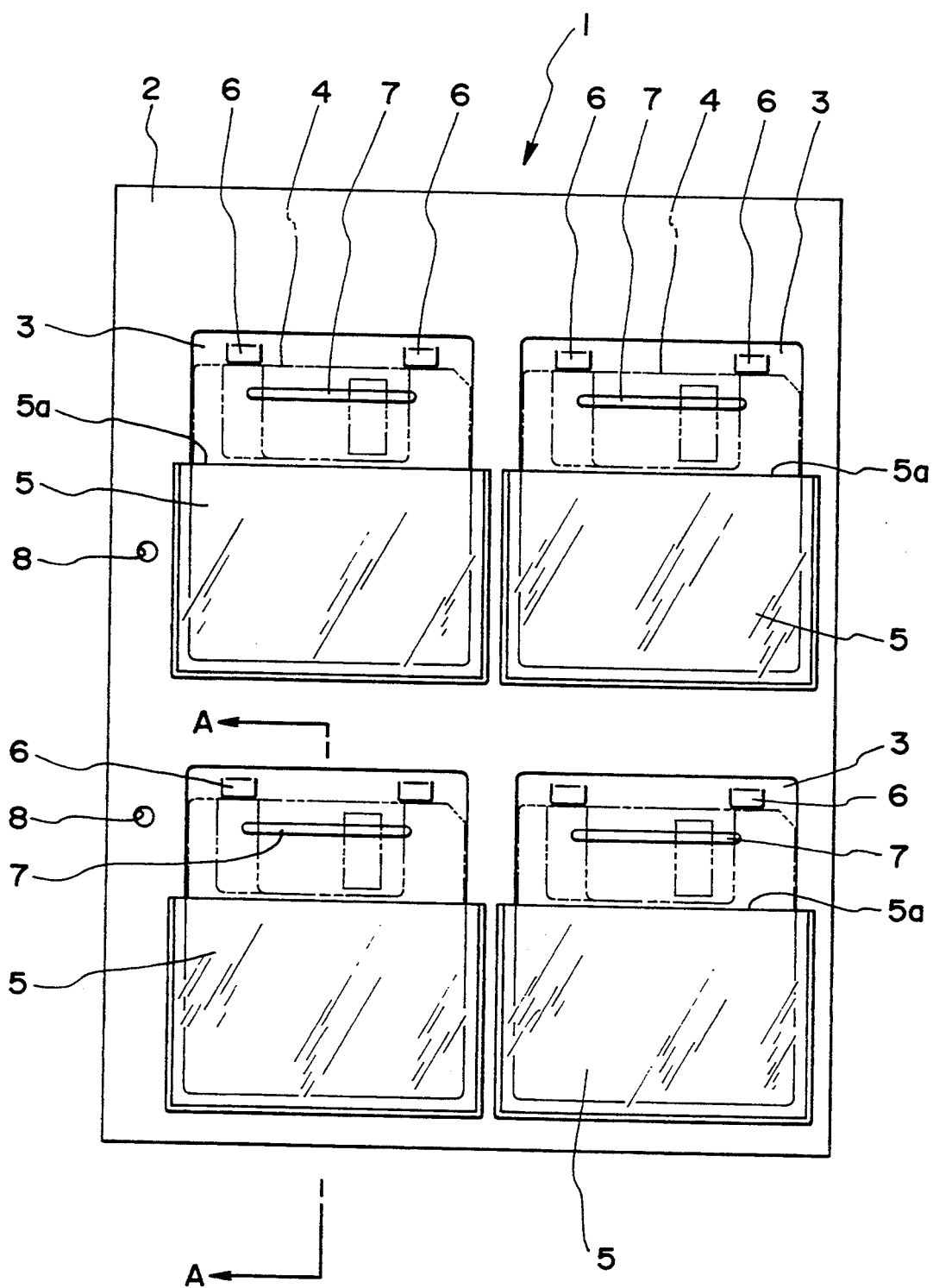
FIG. 1 is a front view showing a floppy disk accommodation device according to the invention.
Figure 2:
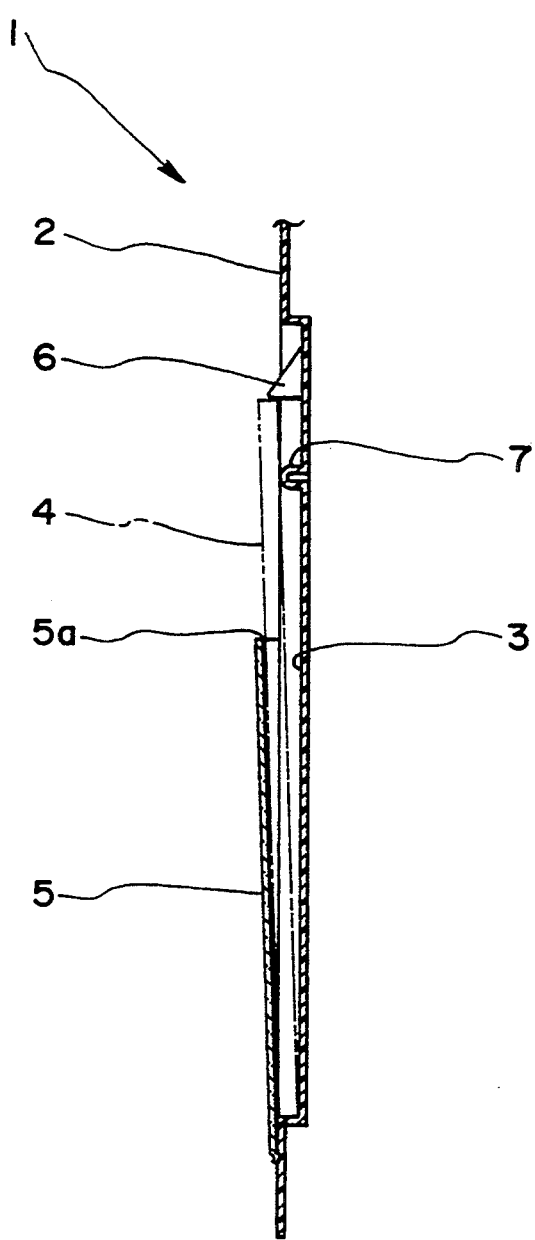
FIG. 2 is a sectional view taken along line A—A in FIG. 1.
Figure 3:
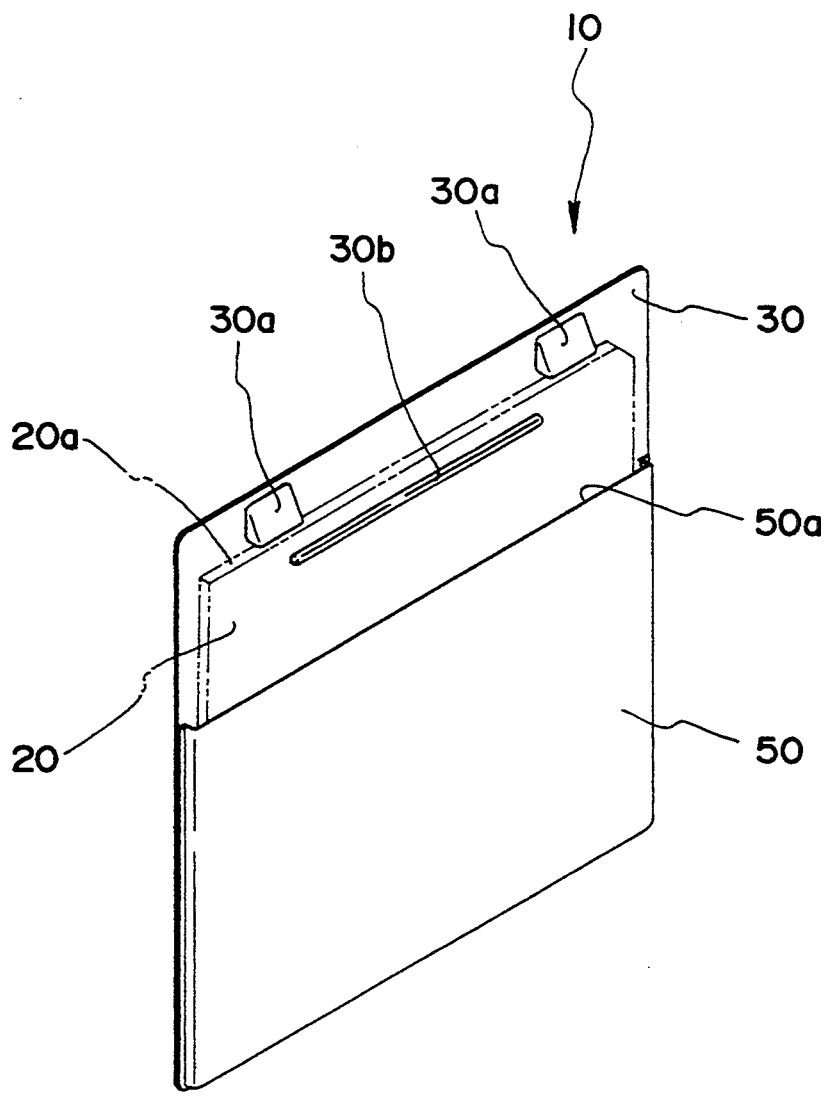
FIG. 3 is a perspective view showing a prior art floppy disk accommodation device.
Figure 4:
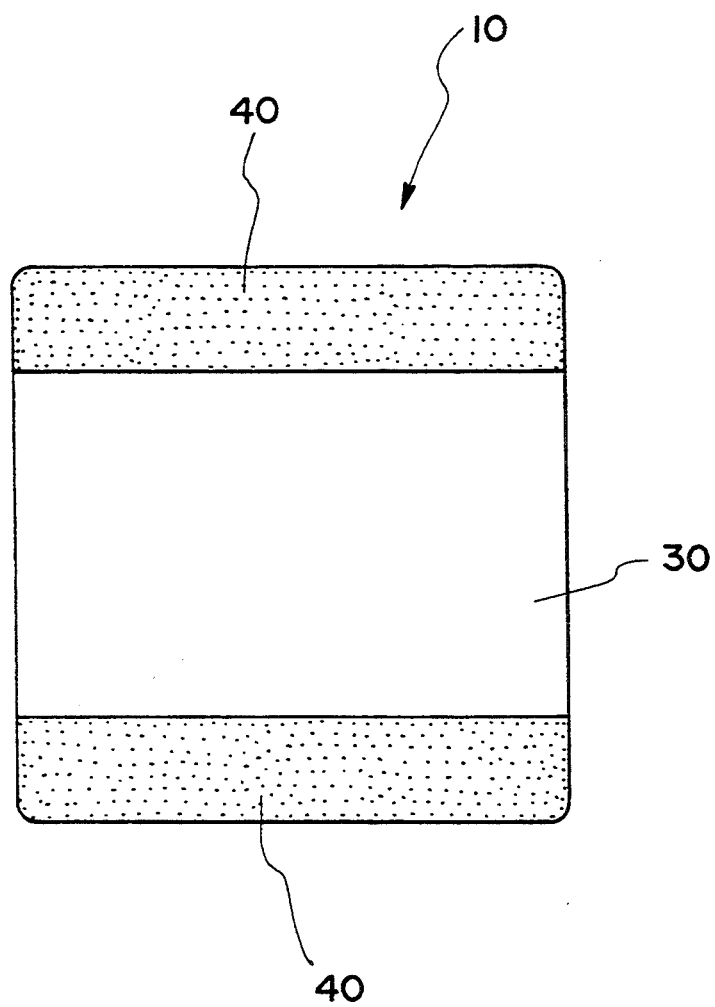
FIG. 4 is a back view showing the prior art floppy disk accommodation device.

FIG. 1 is front view showing a floppy disk a accommodation device according to the invention. The device comprises a synthetic resin sheet 2, which has a plurality of floppy disk accommodation recesses 3 formed in respective positions. The synthetic resin sheet 2 has a top surface, and each of the recesses 3 is formed by an opening in the sheet 2 defined by edges on the top surface of the sheet 2 and a recess surface in the opening located below the top surface, as best seen in FIG. 2. Each floppy disk accommodation recess 3 has a size corresponding to the size of the floppy disk 4 which is accommodated therein.

A bag-like floppy disk detachment-free accommodation section 5 is formed by bonding a soft synthetic resin film to the edges of a lower portion of each floppy disk accommodation recess 3, except for an upper open edge 5a. The detachment of the floppy disk 4 toward the front is thus prevented.

A portion of the surface of the floppy disk accommodation recess 3 is formed, above the opening of the bag-like floppy disk detachment-free accommodation section 5, with stoppers 6 for preventing the detachment of the floppy disk. The stoppers 6 are adapted to be in contact with the upper edge of the accommodated floppy disk 4, thus preventing upward detachment thereof.

A portion of the surface of the floppy disk accommodation recess 3 is formed, between the bag-like floppy disk detachment-free accommodation section 5 and the stoppers 6, with a ridge 7 to provide a gap between the back surface of an upper portion of the accommodated floppy disk 4 and the surface of the floppy disk accommodation recess 3, thus permitting the accommodated floppy disk 4 to be readily taken hold of when removing the floppy disk 4.

Designated at 8 are holes for forming a binder.

In this embodiment, the floppy disk accommodation recesses 3, stoppers 6 and ridges 7 are formed integrally in and on the synthetic resin sheet 2.

In the above structure, the floppy disk 4 can be accommodated by inserting it in the bag-like floppy disk detachment-free accommodation section 5 from the top edge opening 5a thereof. Thus, a plurality of floppy disks can be accommodated neatly in the respective floppy disk accommodation recesses 3 in a stable state and without pulling the bag-like floppy disk detachment-free accommodation sections.

The detachment of the floppy disk toward the front is prevented by the accommodation section 5, and upward detachment is prevented by the stoppers 6.

Further, the floppy disk can be readily and smoothly taken out owing to the gap provided by the ridge 7.

As has been described in the foregoing, the floppy disk accommodation device according to the invention comprises a sheet-like member having one or more floppy disk accommodation recesses, a film member bonded to the edges of a lower portion of each floppy disk accommodation recess except for an upper open edge, thus forming a bag-like disk detachment-free accommodation section having an upper open edge, stopper means formed on the surface of the floppy disk accommodation recess above the upper open edge of the bag-like floppy disk detachment-free accommodation section, the stopper means serving to be in contact with the upper edge of a floppy disk accommodated in the floppy disk accommodation recess, and thus prevent detachment of the floppy disk, and ridge means formed on the surface of the floppy disk accommodation recess between the upper open edge of the bag-like floppy disk detachment-free accommodation section and the stopper means so as to provide a gap between the back surface of an upper portion of the accommodated floppy disk and the surface of the floppy disk accommodation recess. Thus, in the case of accommodating a single floppy disk or a plurality of floppy disks, due to the presence of the floppy disk accommodation recess or recesses, unlike the prior art there is no possibility that the bag-like floppy disk accommodation section is pulled so as to result in distortion or sagging of the sheet-like member.

Further, since there is no possibility of breakage of the bag-like floppy disk accommodation section, the accommodated floppy disk can be protected in a stable state without the possibility of breakage or contamination thereof. Further, when the device is used in a binder, unlike the prior art, there is no possibility of great distortion or sagging of each constituent sheet-like member of the binder. That is, there is no possibility of increasing the binder thickness in a disorderly fashion and bringing about a situation that has to be avoided to the utmost with this kind of binder, which is required has to neatly arrange and store floppy disks. It is thus possible to provide a floppy disk accommodation binder which can accommodate floppy disks in a neatly arranged state and has a high accommodation efficiency.

Further, according to the invention, unlike the prior art, there is no need of any base sheet or bonding means for bonding such a base sheet. Further, the device can be manufactured as a one-piece molding, accurately and highly efficiently.

What is claimed is:

1. A disk accommodation device, comprising:
   a sheet member having at least one disk accommodation recess therein, said sheet member having a top surface, and each one of said at least one disk accommodation recess comprising an opening in said sheet defined by a plurality of edges on said top surface of said sheet member and a recess surface in said opening below said top surface of said sheet member, each one of said at least one floppy disk accommodation recess having an upper portion and a lower portion;
   a film member for each one of said at least one disk accommodation recess, said film member having a plurality of edges including an upper open edge and said plurality of edges of each said film member being bonded to said edges of said sheet member at said lower portion of a respective one of said at least one disk accommodation recess except for an upper open edge of said film member so as to form a disk accommodation section having an upper open end;
   a stopper on said recess surface at said upper portion thereof located above said upper open end of said disk accommodation section for contacting an upper end of a disk when a disk is accommodated in said disk accommodation recess and said disk accommodation section for preventing accidental removal of the disk therefrom; and
   a ridge on said recess surface between said upper open end of said disk accommodation section and said stopper for providing a gap between the back surface of an upper portion of a disk when a disk is accommodated in said disk accommodation recess and said disk accommodation section and said recess surface.

2. The disk accommodation device of claim 1, wherein said sheet member has coupling means therein for coupling said sheet member to a binder.

3. The disk accommodation device of claim 1, wherein said sheet member has a coupling therein.

4. The disk accommodation device of claim 3, wherein said coupling comprises a plurality of holes in said sheet member.

5. The disk accommodation device of claim 1, wherein said sheet member is a flexible synthetic resin sheet, said film member is a synthetic resin film, and said at least one disk accommodation recess, said stopper and said ridge are formed integrally in and on said synthetic resin sheet.

6. The disk accommodation device of claim 5, wherein said at least one disk accommodation recess comprises a plurality of disk accommodation recesses in said sheet member.

7. The disk accommodation device of claim 1, wherein said at least one disk accommodation recess comprises a plurality of disk accommodation recesses in said sheet member.

8. The disk accommodation device of claim 1, wherein said sheet member consists of a single synthetic resin sheet having said at least one disk accommodation recess, said stopper and said ridge formed integrally in and on said synthetic resin sheet.

* * * * *